United States Patent [19]

Hay et al.

[11] Patent Number: 5,177,183

[45] Date of Patent: Jan. 5, 1993

[54] PROCESS FOR SYNTHESIS OF AROMATIC SULFIDES

[76] Inventors: Allan S. Hay, 5015 Glencairn Avenue, Montreal, Quebec H3W 2B3; Zhi Y. Wang, 3600 Parc Ave., Apt. A 1803, 2ontreal, Quebec H2X 3R2, both of Canada

[21] Appl. No.: 575,202

[22] Filed: Aug. 30, 1990

[51] Int. Cl.$^5$ ............ C08G 75/14; C08G 63/00; C08G 63/68; C08G 63/44

[52] U.S. Cl. .................. 528/388; 528/86; 528/271; 528/360; 528/361; 528/362; 528/373

[58] Field of Search ......... 528/86, 388, 271, 360, 528/361, 362, 373

[56] References Cited

U.S. PATENT DOCUMENTS

| | | | |
|---|---|---|---|
| 3,354,129 | 11/1967 | Edmonds, Jr. et al. | 528/388 |
| 3,870,686 | 3/1975 | Campbell | 528/360 |
| 4,605,732 | 8/1986 | Heitz et al. | 528/388 |
| 4,786,713 | 11/1988 | Rule et al. | 528/389 |
| 4,857,629 | 8/1989 | Rule et al. | 528/217 |
| 4,859,762 | 8/1989 | Rule et al. | 528/215 |
| 4,983,720 | 1/1991 | Tsuchida et al. | 528/373 |

OTHER PUBLICATIONS

H. Wayne Hill, Jr. et al, Polymer Engineering and Science, Dec. 1976, vol. 16, No. 12, "Properties, Environmental Stability, and Molding Characteristics of Polyphenylene Sulfide", pp. 831–835.

*Primary Examiner*—John Kight, III
*Assistant Examiner*—T. Mosley
*Attorney, Agent, or Firm*—Bachman & LaPointe

[57] ABSTRACT

Aromatic sulfides including diarylsulfides and poly(arylene sulfides) are produced in a novel synthesis in high yield under moderate conditions by heating an aromatic disulfide in the presence of aromatic halide, in which the halide is chloride, bromide or iodide; the diaryl sulfides are useful precursors and starting materials for a range of compounds and the poly(arylene sulfides) are important high temperature engineering thermoplastics.

12 Claims, No Drawings

PROCESS FOR SYNTHESIS OF AROMATIC SULFIDES

BACKGROUND OF THE INVENTION a) Field of the Invention

This invention relates to a novel process for synthesis of aromatic sulfides including polysulfides.

b) Description of Prior Art

Diaryl sulfides can be synthesized by several reactions including nucleophilic displacement of aryl halides with aromatic thiols catalyzed by nickel (o) or nickel (I) complexes (Takagi, K. Chem. Lett. 2221 (2987), and Cristau, H. J.; Charaud, B.; Chene, A. H.; Synthesis, 892 (1981)), or with arylthiocuprates (Campbell, J. R. J. Org. Chem. 27, 2207 (1962)), sodium sulfide (Hilgetag, G.; Martini, A., Preparative Organic Chemistry, 4th Ed.; John Wiley & Sons: Toronto, 1972; pp. 636–637) or Grignard reagents (Burton, H.; Davy, W. A. J. Chem. Soc. 528 (1948)); the Friedel Crafts reactions using sulfuryl dihalides or arylsulfenyl halides catalyzed by aluminum or iron have also been used (Wilson, H. F.; Tarbell, D. S. J. Am. Chem. Soc. 72, 5200 (1950)), as has a modified Ziegler reaction utilizing the reaction of diazonium salts and arylthiols (Petrillo, G.; Novi, M.; Garbarino, G.; Dell'Erba, C. Tetrahedron Lett. 26, 6365 (1985)); finally there have been used extrusion reactions of aryl disulfides with phosphines (Harpp, D. N.; Gleason, J. G. J. Am. Chem. Soc. 93, 2437 (1971)) or by heating typically at 250°–300° C. in accordance with Equation 1 below.

Eq. 1

Diaromatic sulfides may be employed as precursors or intermediates for a variety of compounds, for example, p-halogenated diaryl sulfides can be oxidized to sulfones which can be reacted with bisphenol A to produce polyethersulfones.

Poly(p-phenylene sulfide) (PPS) is an important high temperature engineering thermoplastic with good mechanical strength, thermal stability, excellent chemical resistance, flame resistance and good electrical characteristics. (Hill and Brady Polym. Eng. Sci. 1976, 16, 832 and Short and Hill Chem. Technol., 1972, 1, 481). The commercial process for the preparation of PPS is based on the method of Edmonds and Hill, U.S. Pat. No. 3,354,129, involving polycondensation of p-dichlorobenzene with sodium sulfide in N-methylpyrrolidone at 240°–260° C. under pressure. PPS has also been synthesized by Lenz (Lenz et al, J. Polym. Sci. 1962, 58, 351) by the self-condensation of p-halobenzenethiolates in pyridine or/and quinoline at high temperatures. Recently copoly(phenylene sulfide-disulfide) containing only very small amounts of disulfide linkages has been synthesized by the direct reaction of sulfur with p-diiodobenzene (U.S. Pat. No. 4,859,762). Other synthetic routes that have been investigated include: 1) the electrophilic substitution of benzene with elemental sulfur in the presence of aluminum chloride (Kreja et al, Angew. Makromol. Chem. 1986, 141, 77); 2) the $S_{RN}$ 1-type polymerization of p-bromobenzenethiolate initiated by a diazonium salt in DMSO at room temperature (Novi, M.; Petrillo, G.; Sartirana, M. L. Tetrahedron Lett. 1986, 27, 6129), 3) the oxidative polymerization of diphenyl disulfide with antimony pentachloride or quinones or vanadyl acetylacetonate under air atmosphere at room temperature, (Tsuchida, E.; Yamamoto, K.; Nishide, H.; Yoshida, S.; Jikei, M. Macromolecules 1989, 22, 2438 and 1990, 23, 2101; and Tsuchida, E.; Yamamoto, K.; Yoshida, S.; Jikei, M.; Nishide, H. Macromolecules 1990, 23, 930). However, polymers prepared by these methods either contain variable amounts of cyclic and crosslinked species (see Kreja et al above) or they are obtained in very low yields (3.9–28%) (see Novi et al above), or they are low molecular weight (ca. $10^3$) and have low melting points (113°–191° C.) (see Tsuchida et al above).

SUMMARY OF THE INVENTION

It is an object of this invention to provide a novel synthesis for aromatic sulfides from diaromatic disulfides.

It is another object of this invention to provide a novel synthesis for diaromatic sulfides from diaromatic disulfides.

It is still a further object of this invention to provide a novel synthesis for symmetrical and non-symmetrical diaromatic disulfides.

It is still a further object of this invention to provide a novel route to poly(p-arylene sulfides) including poly(p-phenylene sulfides).

A process for producing aromatic sulfides comprising: heating a diaromatic disulfide of formula (II):

(II)

wherein $X^1$ and $X^2$ may be the same or different and are each selected from hydrogen, chlorine, bromine and iodine atoms; and $Ar^1$ and $Ar^2$ may be the same or different, substituted or unsubstituted, arylene radicals, $Ar^1$ and $Ar^2$ being selected from hydrocarbon aromatics and heteroaromatics, at a temperature of 165° to 285° C. under a condition in which the heating is carried out in the presence of aromatic chloride, bromide or iodide.

The product aromatic sulfides may be simple diaromatic sulfides of general formula (I):

(I)

in which each Ar, which may be the same or different is selected from substituted or unsubstituted arylene radicals; or poly(arylene sulfides) of general formula (IA):

(IA)

in which n is an integer of up to 500, preferably 100 to 200 reflecting the chain length of the polymer, and Ar throughout the chain length may be the same unsubstituted or substituted arylene radical or may involve two different unsubstituted or substituted arylene radicals. In the case of two different arylene radicals these will typically be randomly distributed along the chain, for example:

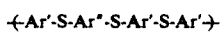

but since the polymer may comprise separately formed polymer units which link together the chain may also include blocks of the form:

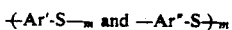

in which Ar' and Ar" are notations for the aromatic nuclei of the polymer and m is an integer identifying the block length.

DESCRIPTION OF PREFERRED EMBODIMENTS

The processes of the invention proceed rapidly in high yield, often close to quantitative conversion.

The processes can be used to produce simple diaryl sulfides and poly(arylene sulfides).

In the diaromatic disulfides of formula (III):

$$X^1\text{-}Ar^1\text{-}S\text{-}S\text{-}Ar^2\text{-}X^2 \qquad (III)$$

the arylene radicals $Ar^1$ and $Ar^2$ may be hydrocarbon aromatic radicals derived from benzene and biphenyl or from condensed ring aromatics for example naphthalene and anthracene; or they may be heteroaromatic radicals containing one or more heteroatoms selected from nitrogen, oxygen and sulphur in the aromatic ring.

Typical nitrogen-containing heteroaromatics include pyridine, pyrazine, and quinoline; typical sulphur containing aromatics include thiophene and benzothiophene; typical oxygen containing aromatics include furan, dibenzofuran and diphenyl ether.

In addition to the possible halogen substitutents $X_1$ and $X_2$ the arylene radicals may optionally be substituted by one or more inert substituents selected from fluorine, carboxyl, cyano, alkoxy, aryloxy, thioalkoxy and thioaryloxy. Typically such alkoxy and thioalkoxy radicals will have 1 to 6 carbon atoms and the aryloxy and thioaryloxy radicals will have 6 to 10 carbon atoms.

When $X^1$ and $X^2$ are halogen atoms they are preferably in the para-positions relative to the disulfide linkage, if poly(arylene sulfides) are to be produced, so as to produce generally linear polymers which are crystalline.

On the other hand, the reaction will proceed when the $X^1$ and $X^2$ halogen atoms are in the meta or ortho positions relative to the disulfide linkage.

i) Diaromatic sulfides

This reaction may conveniently be represented by the reaction of a diaromatic disulfide with an aromatic halide (IV) according to equation 2 to produce a diaromatic sulfide ($I_B$) and halogen.

$$\underset{(III_A)}{\text{Ar}-\text{S}-\text{S}-\text{Ar}} + 2\,\underset{(IV)}{\text{Ar}^3\text{X}} \longrightarrow 2\,\underset{(I_B)}{\text{Ar}-\text{S}-\text{Ar}^3} + X_2 \qquad \text{Eq. 2}$$

In formula ($III_A$) the radicals Ar are selected from the radicals $Ar^1$ and $Ar^2$.

In formula (IV) the radical $Ar^3$ is an aryl radical of the same class as $Ar^1$ and $Ar^2$ and can be the same or different from $Ar^1$ and $Ar^2$.

The reaction may be considered to proceed via a single electron transfer mechanism.

In the reaction of the aromatic disulfide ($III_A$) with the aromatic iodide (IV) only a stoichiometric ratio of disulfide ($III_A$) to aromatic iodide (IV) is required but an excess of the disulfide ($III_A$) facilitates the complete conversion of the aromatic halide (IV).

The reaction is suitably carried out by heating at a temperature of 165° to 285° C., preferably 200° to 270° C., more preferably 230° to 260° C. The reaction can be carried out with or without a solvent, however, it is found to be advantageous to use a solvent to retain the aromatic halide (IV) in solution for the reaction; a suitable solvent for this purpose is diphenyl ether.

In the case in which X is a chlorine or bromine atom it is appropriate to employ a reagent in the reaction system which will react with the liberated chlorine or bromine. Suitable reagents include the alkali metal iodides, for example, sodium iodide and potassium iodide and aromatic compounds which are readily chlorinated or brominated, for example, diphenyl ether or diphenyl sulfide.

If the aryl halide (IV) is replaced by a dihaloaromatic of formula (V):

$$X\text{-}Ar^3\text{-}X \qquad (V)$$

wherein X and $Ar^3$ are as defined previously, simple bisarylenethioarenes of formula (VI) are obtained $$\text{Ar-S-Ar}^3\text{-S-Ar} \qquad (VI)$$

in which Ar and $Ar^3$ are as defined previously.

In the above reaction the haloaromatic (IV) and the dihaloaromatic (V) provide the aromatic halide, i.e., chloride, bromide or iodide of the process of the invention.

It will be recognized that in the case of the simple diaromatic sulfides and bisarylenethioarenes, $X^1$ and $X^2$ are hydrogen atoms and any substituent on Ar in the diaromatic sulfide ($III_A$) should be inert in the reaction; thus, for example, chlorine, bromine and iodine substituents are excluded; but when $X^1$ and $X^2$ are iodine atoms, Ar may be chloro-substituted.

In the case in which $X^1$ and $X^2$ are hydrogen atoms it is to be understood that the aromatic nuclei $Ar^1$ and $Ar^2$ may be fully substituted by radicals selected from the group of fluorine, carboxyl, cyano, alkoxy, aryloxy, thioalkoxy and thioaryloxy. The substituents may be the same or different and all available positions of such aromatic nuclei may be occupied by such substituents so that $X^1$ and $X^2$ will in effect be substituents from the above group rather than hydrogen atoms.

ii) Poly(arylene sulfides)

In the case in which $X^1$ and $X^2$ are chlorine, bromine or iodine atoms the diaromatic disulfide may itself provide the source of aromatic halide and the reaction proceeds to produce poly(arylene sulfide).

The reaction may be represented by equation 3:

$$\underset{(III_B)}{X-Ar-S-S-Ar-X} \longrightarrow \underset{(II)}{(Ar-S)_n} + X_2 \qquad \text{Eq. 3}$$

wherein X is chlorine, bromine or iodine.

In this case each Ar may be the same or different and selected from the arylene radicals defined above for $Ar^1$ and $Ar^2$. This reaction is suitably carried out by heating at a temperature of 200°-270° C., preferably 220°-270° C., and more preferably 250°-260° C., and is suitably carried out in a solvent, for example, diphenyl ether. The polymerization proceeds readily and cleanly to produce the poly(arylene sulfide) in high yield.

The halo groups X are preferably para- to the disulfide linkage in formula ($III_B$).

Compounds of formula ($III_B$) in which X is iodine can be prepared by reaction of potassium iodide with a diazonium salt generated from sodium nitrite and an appropriate aminoaryl disulfide.

In the case in which X is bromine or chlorine a reagent effective to remove halogen atoms $X^1$ and $X^2$ is appropriate, for example, alkali metal iodides, for example, sodium iodide or potassium iodide, and aromatic compounds, for example, diphenyl ether and diphenyl sulfide, and a temperature of 250° to 280° C. is preferred.

EXAMPLES

In examples 1-5 (see Table 1), the reaction between the iodoaromatic compound and diphenyl disulfide was carried out in a reaction tube, while a stream of nitrogen was being introduced. The reaction tube was heated in a silicone oil bath or a sand bath at the temperatures and for the times indicated in each example. The analysis of the products was performed with high pressure liquid chromatography (HPLC).

TABLE 1

Ph—S—S—Ph + 2 Ar—I ⟶ 2 Ph—S—Ar + $I_2$

| Example | Iodoaromatics (g) | Diphenyl disulfide (g) | Ar |
|---|---|---|---|
| 1 | iodobenzene (2.04) | 1.09 | Ph |
| 2 | 4-iodotoluene (0.218) | 0.328 | 4-$CH_3$Ph- |
| 3 | 1-iodonaphthalene (0.508) | 0.240 | 1-Naphthyl |
| 4 | 1,4-diiodobenznene (0.330) | 0.436 | 1,4-phenylene |
| 5 | 4,4'-diiodobiphenyl (3.57) | 3.27 | 1,4-biphenylene |

EXAMPLE 1

After heating at 170°-185° C. for 12 hours, the reaction was stopped. HPLC analysis showed that the mixture contained mainly diphenyl sulfide (99.6%) and a small amount of iodobenzene (0.15%). Conversion of iodobenzene was greater than 99%.

EXAMPLE 2

The mixture in diphenyl ether (0.1 mL) was heated at 250° C. for 4 hours. Conversion of 4-iodotoluene was quantitative. The crude product was purified by flash chromatography (petroleum ether) to yield phenyl 4-tolyl sulfide (140 mg, 70%).

EXAMPLE 3

After heating at 240° C. for 6 hours, the reaction mixture was cooled to room temperature. Conversion of 1-iodonaphthalene was about 95%. Flash chromatography of crude product (petroleum ether) gave 1-naphthyl phenyl sulfide (280 mg, 59.3%) as an oil.

EXAMPLE 4

The mixture in diphenyl ether (1.0 mL) was heated at 240°-250° C. for about 20 hours and cooled to room temperature. The mixture was diluted with petroleum ether (1.0 mL) and purified by flash chromatography (petroleum ether) to yield 1,4-bis(phenylthio)benzene (165 mg, 56.1%) with a melting point of 78°-79° C. (mp 81° C., Koch, W.; Heitz, W. *Makromol. Chem.* 184, 779 (1983)).

EXAMPLE 5

The mixture in diphenyl ether (4.0 mL) was heated at 220°-230° C. for 36 hours and cooled to room temperature. The reaction mixture was triturated with methanol and brownish solids were filtered off. Recrystallization from i-propanol (treated with charcoal) afforded 4,4'-bis(phenylthio)biphenyl (2.45 g, 75.2%) with a melting point of 116°-117° C. (mp 119°-120° C., Campbell, J. R. *J. Org. Chem.* 27, 2207 (1962)).

EXAMPLE 6

A mixture of dibenzyl disulfide (148 mg, 0.6 mmol) and 1-iodonaphthalene (254 mg, 1.0 mmol) in diphenyl ether (400 mg) was heated at 250°-270° C. for one and half hours and cooled to room temperature. The mixture was diluted with petroleum ether (2.0 mL) and chromatographied on silica gel, eluted with petroleum ether, to yield di-1-naphthylsulfide (120 mg, 84% based on 1-iodonaphthalene) as yellow solids. The recrystalized product had a melting point of 108.5°-109.5° C. (ethanol); lit. mp 110° C. (CRC Handbook of Chemistry & Physics, 68th Ed.); $^1$H NMR (200 MHz, $CDCl_3$) d 7.32 (br d, 2H, $H_{2,3}$), 7.54 (sextet, 2H, $H_{7,8}$), 7.78 (br t, 1H, $H_4$), 7.89 (sextet, 1H, $H_6$), 8.43 (sextet, 1H, $H_5$); MS (EI, m/e, relative intensity) 286 ($M^+$, 100).

EXAMPLE 7

The mixture of n-butyl disulfide (356 mg, 2.0 mmol) and 1-iodonaphthalene (508 mg, 2.0 mmol) was heated at 235°-240° C. for 2 hours. After cooled to room temperature, the solids were dissolved in methylene chloride and the solution was filtered through a pad of silica ge. The filtrate was concentrated to dryness under vacuum and the residue was recrystallized from ethanol to give di-1-naphthylsulfide (135 mg, 47.2%, mp 108°-109° C.).

Polymerization of 4-iodophenyl disulfide

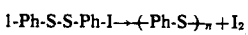

In the following examples, the polymerization reaction was carried out in diphenyl ether as solvent, unless otherwise indicated, at the temperatures indicated. The conditions of the polymerization reaction and the characterization of the polymers are presented in the Table 2. A typical polymerization procedure is as follows: 4-Iodophenyl disulfide (940 mg, 2.0 mmol) and diphenyl ether (1.8 g) were placed in a Pyrex test tube (1.5×15 cm). The tube was immersed in a heated sand bath to a depth of about 2 cm deep to cover the contents inside. The reaction temperature was controlled at 250°-260° C. and held at that temperature for 18 hours while a stream of nitrogen was bubbled into the solution through a pipette. The reaction mixture was diluted with 1-chloronaphthalene (4 mL) and the solution was allowed to cool to room temperature. The resulting solids were triturated with methanol and poured into methanol (200 mL). The polymer was collected by filtration and then dissolved in 1-chloronaphthalene (about 5 mL). After the solution was cooled to room temperature, methanol (100 mL) was added. The polymer was filtered with suction and stirred in hot chloroform and then hot methanol, respectively. After drying in air and then in a vacuum oven at 120° C. overnight, poly(p-phenylene sulfide) (PPS) was obtained as a pale yellow powder (398 mg, 92%). The analytical data is presented in table 2 (example 10).

TABLE 2

| Example | Temp. (°C.) | Time (h) | Yield (%) | Tm (°C.) | Expl. Formula | C | H | S | I | DP[a] |
| --- | --- | --- | --- | --- | --- | --- | --- | --- | --- | --- |
| 8 | 220–230 | 40 | 96 | 270 | $C_{6.0}H_{4.1}S_{1.0}$ | 63.90 | 3.61 | 28.40 | 4.3 | 50 |
| 9 | 240–250 | 30 | 94 | 272 | $C_{6.5}H_{4.7}S_{1.0}$ | 66.03 | 3.96 | 27.10 | 2.6 | 86 |
| 10 | 250–260 | 18 | 92 | 285 | $C_{6.6}H_{4.5}S_{1.0}$ | 64.63 | 3.72 | 26.30 | 2.3 | 100 |
| 11 | 260–270 | 8 | 95 | 285 | $C_{6.3}H_{4.3}S_{1.0}$ | 65.92 | 3.70 | 27.80 | 1.3 | 183 |

[a]the degree of polymerization (DP) is calculated from the elemental analyses, assuming that both ends of PPS are iodo groups.

Polymerization of 4-bromophenyl disulfide

In the following examples, the polymerization procedures are similar to that described above for example 10, except for the solvent or other reagent used as indicated in each example. Microanalyses of the products from examples 12–15 are presented in the Table 3.

EXAMPLE 12

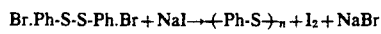
Br.Ph-S-S-Ph.Br + NaI → (Ph-S)$_n$ + I$_2$ + NaBr

4-Bromophenyl disulfide (374 mg, 1.0 mmol) and sodium iodide (830 mg, 5.0 mmol) were ground together to a fine powder and then placed in a test tube, followed by 0.5 mL of diphenyl ether. The mixture was heated at 250°–260° C. for 18 hours. After cooling to about 180° C. 1-chloronaphthalene (1.5 mL) was added to the reaction mixture and the solution was poured into methanol (40 mL) with stirring. The polymer was isolated by filtration and washed with water, methanol, methylene chloride and methanol, respectively. After drying in air and then at 80° C. under vacuum overnight, the polymer was obtained as a yellow powder (100 mg, 46%).

EXAMPLE 13

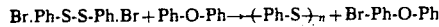
Br.Ph-S-S-Ph.Br + Ph-O-Ph → (Ph-S)$_n$ + Br-Ph-O-Ph

4-Bromophenyl disulfide (300 mg) in diphenyl ether (0.5 g) was heated at 250°–260° C. for 18 hours. After workup as above in example 12 the polymer was obtained as a white powder (155 mg, 89.6%).

EXAMPLE 14

4-Bromophenyl disulfide (600 mg) in diphenyl sulfide (1.0 mL) was heated at 230°–250° C. for 21 hours. After workup as above in example 12 the polymer was obtained as an off-white powder (260 mg, 75%).

EXAMPLE 15

4-Bromophenyl disulfide (748 mg, 2.0 mmol) in diphenyl ether (340 mg, 2.0 mmol) was heated at 260° C. for 18 hours. After workup as above in example 12 polymer was obtained as an off-white powder (380 mg, 88%).

TABLE 3

| Example | Tm (°C.) | Expl. Formula | C | H | S | Br |
| --- | --- | --- | --- | --- | --- | --- |
| 12 | 275 | $C_{6.2}H_{4.5}S_{1.0}$ | 64.05 | 3.92 | 27.55 | 2.46 |
| 13 | 195 | $C_{6.1}H_{4.5}S_{1.0}$ | 66.64 | 4.16 | 29.12 | 0.61 |
| 14 | 253 | $C_{5.5}H_{4.2}S_{1.0}$ | 64.93 | 4.15 | 31.36 | 0.00 |
| 15 | 250 | $C_{6.6}H_{4.9}S_{1.0}$ | 67.62 | 4.20 | 27.24 | 1.69 |

EXAMPLE 16

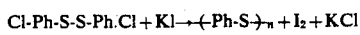
Cl-Ph-S-S-Ph.Cl + KI → (Ph-S)$_n$ + I$_2$ + KCl

A mixture of 4-chlorophenyl disulfide (290 mg, 1.0 mmol), potassium iodide (865 mg) and diphenyl ether (0.5 mL) was heated at 280° C. for 22 hours. After heating for 10 minutes an iodine color was noted in the reaction solution. Following the same workup procedure as described above for example 12, polymer was obtained as a light yellow solid (140 mg, 65%) which melted at 175° C.

EXAMPLE 17

A mixture of 4-fluorophenyl disulfide (100 mg), potassium iodide (350 mg) and diphenyl ether (0.2 mL) was heated at 280° C. for 18 hours and no iodine color was noted. Thin layer chromatography (TLC) showed that 4-fluorophenyl disulfide remained in the mixture as a major component.

EXAMPLE 18

To a stirred suspension of 4-aminophenyl disulfide (7.452 g, 30.0 mmol, technical grade) in water (250 mL) was added sulfuric acid (60 mL) slowly at 0° C., followed by the addition of a solution of sodium nitrite (4.5 g) in water (15 mL). The resulting yellow solution was stirred at 0° C. for 15 minutes and then added to a solution of sodium iodide (20 g) and iodine (20 g) in water (30 mL) slowly at 0° C. During the addition methylene chloride (about 50 mL) was added to keep the products in solution. After stirring at room temperature overnight, the mixture was diluted with methylene chloride (400 mL) and the two phases were partitioned. The organic phase was washed with concentrated sodium bisulfite solution, sodium bicarbonate solution and water, respectively. After drying over anhydrous sodium sulfate, the solvent was removed under vacuum. Purification of the residual yellow solid from ethanol afforded 4-iodophenyl disulfide as a yellow amorphous solid: 8.25 g (58.5%); mp 122°–123° C. (Lit. mp 124.5°–125.5° C.).

EXAMPLE 19

1-Aminonaphthalene-4-sulfonic acid (44.6 g, 0.2 mol) was suspended in water (350 mL) and neutralized with sodium carbonate (22.0 g). A clear solution was obtained and sodium nitrite (15.0 g) was added. To cold aqueous sulfuric acid (75 mL of sulfuric acid in 200 mL of water) in a 4.0 L beaker with mechanical stirring, was added slowly the above solution. After addition was complete the reaction mixture was stirred for 10 min, and urea (5.0 g) was added to the yellow suspension. After bubbling ceased, the diazonium salt was collected by filtration, washed with water and dried in air. The yellow solids were then added to a stirred solution of sodium iodide (100 g), iodine (10.0 g) and sulfuric acid (25 mL) in water (225 mL) in a 2.0 L beaker. The resulting red suspension was heated at 70°–80° C. for a half hour and stirred at room temperature for 10 hours. The reaction mixture was basified with concentrated sodium hydroxide solution to pH 11–12. The resulting yellow solids were collected on the filter funnel, washed with water and dried in air. The crude 1-iodonaphthalene-4-sulfonic acid sodium salt (52.0 g) was suspended in phosphorus oxychloride (150 mL) and the suspension was stirred at 120° C. for 5 hours. The dark colored solution was cooled to room temperature and poured into 500 g of crushed ice. The mixture was then stirred for 30 min. The solids were filtered, washed with water and dried in air. Recrystallization from cyclohexane (treated with charcoal) afforded 1-iodonaphthalene-4-solfonyl chloride as yellow crystals (44.0 g, 62.4%) with a melting point of 122°-123° C. (lit. mp 121°-124.5° C.).

1-Iodonaphthalene-4-solfonyl chloride (14.1 g, 40 mmol), dry sodium iodide (35.0 g) and tetra-*n*-butylammonium iodide (0.5 g) were mixed in dry methylene chloride (100 mL). Trimethylsilyl chloride (30 mL) was then added and the solution was stirred at room temperature for 48 hours. The reaction mixture was diluted with chloroform (200 mL) and neutralized with aqueous sodium bicarbonate. The organic phase was washed with aqueous sodium bisulfide solution and water. After drying over anhydrous sodium sulfate, the solvent was removed under vacuum. The residual solids were recrystallized from acetic acid to give 4-iodonaphthyl disulfide as pale yellow crystals (8.05 g, 70.6%); mp 129°-131° C.; $^1$H NMR (200 MHz, CDCl$_3$) $\delta$7.29 (d, J=7.7 Hz, 1H), 7.57 (m, 2H), 7.92 (d, J=7.7 Hz, 1H), 8.13 (m, 1H), 8.26 (m, 1H).

EXAMPLE 20

Starting from 5-aminonaphthalene-1-sulfonic acid and using the procedure described in example 19, 5-iodonaphthalene-1-sulfonyl chloride was obtained in 25.7-30% yields as yellow crystals, after recrystallization from cyclohexane; mp 113.0°-113.5° C. (lit. mp 113° C.).

5-Iodonaphthyl disulfide was prepared in 44.5% yield and purified by recrystallization from chloroform; mp 202°-203° C.; $^1$H NMR (200 MHz, CDCl$_3$) $\delta$7.16 (d d, J=7.40 Hz, J=8.42 Hz, 1H), 7.37 (d d, J=7.26 Hz, J=8.50 Hz, 1H), 7.61 (d d, J=1.06 Hz, J=7.26 Hz, 1H), 8.10 (m, 2H), 8.31 (d, J=8.50 Hz, 1H).

EXAMPLE 21

5-Iodonaphthyl disulfide (820 mg, 1.44 mmol) and diphenyl ether (2.5 mL) were placed in a test tube. The mixture was heated at 260°-270° C. under nitrogen for 1 hour. The evolution of iodine ceased and yellow solids came out of the reaction solution. After cooling to room temperature, methanol was added and the polymer was filtered. After washing in hot methanol and hot chloroform, respectively, the polymer was collected on the filter funnel and dried at 110° C. under vacuum overnight. Poly(1,5-naphthalene sulfide) was obtained as a light yellow powder (460 mg) with a melting point of 428° C. which was only soluble in hot sulfuric acid.

EXAMPLE 22

4-Iodonaphthyl disulfide (390 mg, 0.68 mmol) and diphenyl ether (0.5 g) were placed in a test tube. The mixture was heated at 240°-250° C. under nitrogen for 20 hours. After cooling to room temperature, methanol was added and the polymer was filtered. The polymer was dissolved in N-methylpyrrolidone and poured into methanol. The precipitated powder was filtered and washed in hot methanol. After drying at 70° C. under vacuum overnight, poly(1,4-naphthalene sulfide) was obtained as a light yellow powder (185 mg, 85.6%) which had a Tg of 160° C. and Tm of 230° C.

EXAMPLE 23-6

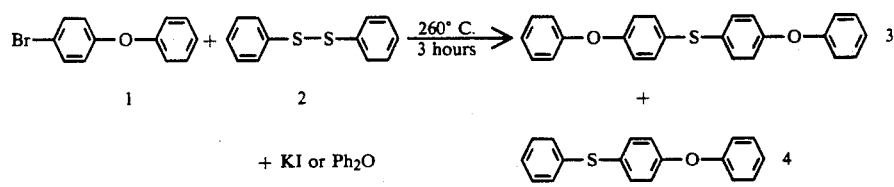

The reactions for the examples 23-26 were carried out at 260° C. for 3 hours in the presence of potassium iodide or diphenyl ether as indicated in the table 4. The reaction mixtures were analyzed by HPLC and the yields was determined byo HPLC. Products 3 and 4 were isolated by flash chromatography (hexane) and characterized by $^1$H NMR and mass spectroscopy.

TABLE 4

| Example | Reactant$^a$ 1 | 2 | Reagent (mmol) | Product (%$^b$) 3 | 4 |
|---|---|---|---|---|---|
| 23 | 2.0 | 1.0 | KI(5.0) | 8.9 | 61 |
| 24 | 2.0 | 1.0 | — | 26 | 23 |
| 25 | 1.0 | 1.0 | Ph$_2$O(1.0) | 42 | 22 |
| 26 | 1.0 | 1.0 | Ph$_2$O(excess) | 13 | 58 |

$^a$numbers are in mmol unit;
$^b$determined by HPLC.

EXAMPLE 27

Bis(4-chlorophenyl) disulfide (292 mg, 1.02 mmol) and 1-iodonaphthalene (540 mg, 2.13 mmol) were added to a Pyrex test tube which was placed in a sand bath heated at 270° C. A gentle stream of nitrogen was introduced into the test tube through a pipette. The reaction was monitored by HPLC and TLC. After about 2 hours the reaction mixture was cooled to room temperature and diluted with petroleum ether (1 mL). The crude products were chromatographied on a silica gel column, eluted with petroleum ether. 4-Chlorophenyl-1-naphthyl sulfide was obtained as a white crystalline solid: 320 mg (58%); mp 42°-44° C.); MS (m/e, %) 270 (M+·, 100).

EXAMPLE 28

The reaction was carried out as for Example 27. Bis(4-fluorophenyl) disulfide (134 mg, 0.527 mmol) and 1-iodonaphthalene (572 mg, 2.25 mmol) were reacted and 4-fluorophenyl-1-naphthyl sulfide was obtained as a clear liquid: 200 mg (75%); MS (m/e, %) 254 (M+·, 100).

We claim:

1. A process for producing a poly(arylene sulfide) comprising:
heating a halodisulfide of formula (III$_B$):

at a temperature of 200° to 270° C. to form a poly(arylene sulfide) composed of arylene sulfide units of formula:

derived solely from said halodisulfide, in which each Ar is the same or different and is a divalent hydrocarbon aromatic radical unsubstituted or substituted one or more times by radicals selected from the group consisting of fluorine, carboxyl, cyano, alkoxy, aryloxy, thioalkoxy and thioaryloxy; and $X^1$ and $X^2$ are each selected from the group consisting of chlorine, bromine and iodine atoms.

2. A process according to claim 1, in which $X^1$ and $X^2$ are both iodine atoms.

3. A process according to claim 1, wherein $X^1$ and $X^2$ are selected from the group consisting of chlorine and bromine atoms and said heating is carried out in the presence of an agent effective to react with chlorine or bromine liberated during said heating.

4. A process according to claim 2, in which each Ar is the same and said poly(arylene sulfide) has repeating units of the formula:

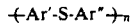

in which n is an integer greater than 100.

5. A process according to claim 2, in which each Ar is different and said poly(arylene sulfide) has repeating units of general formula:

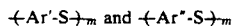

where n is an integer greater than 100, and Ar' and Ar" are the same or different aromatic nuclei, said repeating units being composed of chain units in which the same or different Ar' and Ar" radicals are randomly distributed along the chain units and block units of formulae:

$+Ar'\text{-}S\text{+}_m$ and $+Ar''\text{-}S\text{+}_m$ in which each Ar' is the same and each Ar" is the same and Ar' and Ar" represent different aromatic nuclei Ar and m is an integer identifying the length of the block unit, said chain units being interrupted by said block units.

6. A process according to claim 2, comprising heating said halodisulfide in diphenylether as solvent.

7. A process according to claim 2 in which said poly(arylene sulfide) has repeating units of general formula:

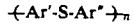

in which Ar' and Ar" are the same or different and are selected from the same group as Ar, at least some of Ar' and Ar" being different and randomly distributed along the repeating units.

8. A process according to claim 2 in which said poly(arylene sulfide) is omposed of block units of formulae:

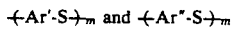

in which Ar' and Ar" represent different aromatic nuclei Ar and m is an integer identifying the length of the block unit.

9. A process for producing a poly(arylene sulfide) consisting essentially of heating a halodisulfide of formula ($III_B$):

$X^1\text{-}Ar\text{-}S\text{-}S\text{-}Ar\text{-}X^2$           ($III_B$)

at a temperature of 200° to 270° C. to form a poly(arylene sulfide) from said halodisulfide, in which each Ar is the same or different and is a divalent hydrocarbon aromatic radical unsubstituted or substituted one or more times by radicals selected from the group consisting of fluorine, carboxyl, cyano, alkoxy, aryloxy, thioalkoxy and thioaryloxy; and $X^1$ and $X^2$ are each selected from the group consisting of chlorine, bromine and iodine atoms.

10. A process according to claim 9, wherein $X^1$ and $X^2$ are selected from the group consisting of chlorine and bromine atoms and said heating is carried out in the presence of an agent effective to react with chlorine or bromine liberated during said heating.

11. A process according to claim 9, wherein $X^1$ and $X^2$ are iodine atoms.

12. A process according to claim 1, wherein $X^1$ and $X^2$ are iodine atoms.

* * * * *